United States Patent
Tandon et al.

(10) Patent No.: US 9,636,589 B2
(45) Date of Patent: May 2, 2017

(54) DETECTING LAG SWITCH CHEATING IN GAME

(75) Inventors: Vinod Tandon, San Diego, CA (US); Jake Devore, Covington, WA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 262 days.

(21) Appl. No.: 12/917,642

(22) Filed: Nov. 2, 2010

(65) Prior Publication Data

US 2012/0108327 A1    May 3, 2012

(51) Int. Cl.
| | |
|---|---|
| G06F 17/00 | (2006.01) |
| A63F 13/75 | (2014.01) |
| A63F 13/71 | (2014.01) |
| A63F 3/00  | (2006.01) |
| H04L 29/08 | (2006.01) |
| A63F 13/35 | (2014.01) |
| A63F 13/34 | (2014.01) |
| A63F 13/79 | (2014.01) |
| H04L 29/06 | (2006.01) |

(52) U.S. Cl.
CPC .......... *A63F 13/75* (2014.09); *A63F 3/00643* (2013.01); *A63F 13/34* (2014.09); *A63F 13/35* (2014.09); *A63F 13/71* (2014.09); *A63F 13/79* (2014.09); *H04L 67/125* (2013.01); *H04L 67/38* (2013.01); *H04L 69/28* (2013.01); *A63F 2300/534* (2013.01); *A63F 2300/535* (2013.01); *A63F 2300/5586* (2013.01); *H04L 63/0428* (2013.01)

(58) Field of Classification Search
CPC .......... A63F 13/12; A63F 13/30; A63F 13/31; A63F 13/32; A63F 13/33; A63F 13/335; A63F 13/34; A63F 13/70; A63F 13/75
USPC ...................................... 463/29, 42
See application file for complete search history.

(56) References Cited

U.S. PATENT DOCUMENTS

| | | |
|---|---|---|
| 5,638,446 A | 6/1997 | Rubin |
| 5,768,382 A | 6/1998 | Schneier |
| 5,892,900 A | 4/1999 | Ginter |
| 5,910,987 A | 6/1999 | Ginter |
| 5,915,019 A | 6/1999 | Ginter |
| 5,917,912 A | 6/1999 | Ginter |
| 5,949,876 A | 9/1999 | Ginter |
| 5,970,143 A | 10/1999 | Schneier |
| 5,982,891 A | 11/1999 | Ginter |

(Continued)

FOREIGN PATENT DOCUMENTS

| | | |
|---|---|---|
| CN | 1290437 A | 4/2001 |
| JP | 2000040045 | 2/2000 |

(Continued)

OTHER PUBLICATIONS

Cronin, E., "Cheat-Proofing Dead Reckoned Multiplayer Games (Extended Abstract)." 2003, Proc. ADCOG, pp. 1-7.*

(Continued)

*Primary Examiner* — Lawrence Galka
(74) *Attorney, Agent, or Firm* — Polsinelli LLP

(57) ABSTRACT

Detecting lag switch cheating in a gaming network is disclosed. Data packets are received from a client. The data packets have tracking data including at least one of a sequence number and a time stamp. The tracking data is monitored to determine that a cheat-detection event has occurred.

21 Claims, 4 Drawing Sheets

(56) References Cited

U.S. PATENT DOCUMENTS

| | | | |
|---|---|---|---|
| 6,021,219 A | 2/2000 | Andersson | |
| 6,134,237 A * | 10/2000 | Brailean et al. | 370/394 |
| 6,165,072 A | 12/2000 | Davis | |
| 6,237,786 B1 | 5/2001 | Ginter | |
| 6,253,193 B1 | 6/2001 | Ginter | |
| 6,363,488 B1 | 3/2002 | Ginter | |
| 6,389,402 B1 | 5/2002 | Ginter | |
| 6,405,104 B1 | 6/2002 | Dougherty | |
| 6,427,140 B1 | 7/2002 | Ginter | |
| 6,640,304 B2 | 10/2003 | Ginter | |
| 6,658,568 B1 | 12/2003 | Ginter | |
| 6,779,004 B1 | 8/2004 | Zintel | |
| 6,829,634 B1 | 12/2004 | Holt | |
| 6,850,252 B1 | 2/2005 | Hoffberg | |
| 6,850,909 B1 | 2/2005 | Aiello | |
| 6,865,735 B1 | 3/2005 | Sirer | |
| 6,948,070 B1 | 9/2005 | Ginter | |
| 7,043,641 B1 | 5/2006 | Martinek | |
| 7,051,212 B2 | 5/2006 | Ginter | |
| 7,069,451 B1 | 6/2006 | Ginter | |
| 7,076,652 B2 | 7/2006 | Ginter | |
| 7,168,089 B2 | 1/2007 | Nguyen | |
| 7,169,050 B1 | 1/2007 | Tyler | |
| 7,288,027 B2 | 10/2007 | Overton | |
| 7,367,888 B1 | 5/2008 | Chen | |
| 7,392,422 B2 | 6/2008 | Van Datta | |
| 7,480,656 B2 | 1/2009 | Harris | |
| 7,515,718 B2 | 4/2009 | Nguyen | |
| 7,517,282 B1 | 4/2009 | Pryor | |
| 7,543,152 B2 | 6/2009 | Hamalainen et al. | |
| 7,584,154 B1 | 9/2009 | Chen et al. | |
| 7,610,505 B2 | 10/2009 | Datta | |
| 7,695,370 B2 | 4/2010 | Liu | |
| 7,720,962 B2 | 5/2010 | Gupta | |
| 7,753,795 B2 | 7/2010 | Harris | |
| 7,780,526 B2 | 8/2010 | Nguyen | |
| 7,801,957 B2 | 9/2010 | Guo | |
| 8,032,502 B2 | 10/2011 | Harris et al. | |
| 8,033,913 B2 | 10/2011 | Cockerille et al. | |
| 8,057,298 B2 | 11/2011 | Nguyen et al. | |
| 8,065,394 B2 | 11/2011 | Crowder et al. | |
| 8,115,765 B2 | 2/2012 | Sommers | |
| 8,137,200 B2 | 3/2012 | Kelly et al. | |
| 8,251,810 B2 | 8/2012 | Van Luchene | |
| 8,715,072 B2 | 5/2014 | Harris | |
| 8,972,364 B2 | 3/2015 | Harris | |
| 9,526,990 B2 | 12/2016 | Harris | |
| 2001/0044339 A1 | 11/2001 | Cordero | |
| 2002/0075805 A1 | 6/2002 | Gupta | |
| 2002/0078464 A1 | 6/2002 | Dravida | |
| 2002/0085552 A1 | 7/2002 | Tandon | |
| 2002/0184310 A1 | 12/2002 | Traversat | |
| 2003/0027639 A1 | 2/2003 | Peterson | |
| 2003/0070070 A1 | 4/2003 | Yeager | |
| 2003/0078103 A1 | 4/2003 | LeMay | |
| 2003/0137110 A1 | 7/2003 | Huard | |
| 2003/0176218 A1 | 9/2003 | LeMay | |
| 2003/0177347 A1 | 9/2003 | Schneier et al. | |
| 2003/0195025 A1 | 10/2003 | Hill | |
| 2003/0216962 A1 | 11/2003 | Heller et al. | |
| 2003/0226007 A1 | 12/2003 | Olson | |
| 2003/0229789 A1 | 12/2003 | Morais | |
| 2004/0093372 A1 | 5/2004 | Chen | |
| 2004/0127277 A1 | 7/2004 | Walker | |
| 2004/0166942 A1 | 8/2004 | Muir | |
| 2004/0193919 A1 | 9/2004 | Dabbish | |
| 2004/0242321 A1 * | 12/2004 | Overton | 463/29 |
| 2004/0259633 A1 | 12/2004 | Gentles | |
| 2005/0086288 A1 | 4/2005 | Datta | |
| 2005/0086369 A1 | 4/2005 | Mai | |
| 2005/0101374 A1 | 5/2005 | Acres | |
| 2006/0036874 A1 | 2/2006 | Cockerille et al. | |
| 2006/0040741 A1 | 2/2006 | Griswold et al. | |
| 2006/0063590 A1 | 3/2006 | Abassi | |
| 2006/0089200 A1 | 4/2006 | Twerdahl | |
| 2006/0100010 A1 | 5/2006 | Gatto | |
| 2006/0160621 A1 | 7/2006 | Rowe et al. | |
| 2006/0190281 A1 | 8/2006 | Kott | |
| 2006/0221825 A1 | 10/2006 | Okano | |
| 2007/0066398 A1 | 3/2007 | Rowan | |
| 2007/0210929 A1 | 9/2007 | Sabata et al. | |
| 2007/0218996 A1 | 9/2007 | Harris et al. | |
| 2007/0238528 A1 | 10/2007 | Harris | |
| 2007/0276521 A1 | 11/2007 | Harris | |
| 2007/0294399 A1 * | 12/2007 | Grossner et al. | 709/224 |
| 2008/0207319 A1 | 8/2008 | Okada | |
| 2008/0305869 A1 | 12/2008 | Konforty et al. | |
| 2008/0313346 A1 * | 12/2008 | Kujawa et al. | 709/236 |
| 2009/0113515 A1 * | 4/2009 | Zalewski | 726/1 |
| 2010/0029370 A1 * | 2/2010 | Robinson et al. | 463/25 |
| 2010/0197405 A1 * | 8/2010 | Douceur et al. | 463/42 |
| 2011/0269547 A1 | 11/2011 | Harris et al. | |
| 2012/0088585 A1 | 4/2012 | Harris et al. | |
| 2014/0100027 A1 | 4/2014 | Harris | |
| 2014/0187316 A1 | 7/2014 | Harris | |
| 2014/0309024 A1 | 10/2014 | Harris | |

FOREIGN PATENT DOCUMENTS

| | | |
|---|---|---|
| JP | 2004021549 | 1/2004 |
| JP | 2004164640 | 6/2004 |
| JP | 2006006473 | 1/2006 |
| JP | 2014-502175 | 1/2014 |
| WO | WO 2007/109130 | 9/2007 |
| WO | WO 2012/060900 | 5/2012 |

OTHER PUBLICATIONS

Dunsmore, Stuart, "PunkBuster Server (beta) version 0.947," PunkBuster, 2000-2001, Even Balance, Inc., http://www.web.archive.org/web/20020211181729/www.evenbalance.com/pbmanual/serverman.htm.

Paul Gauthier et al."Dealing with Cheaters in Anonymous Peer-to-Peer Networks" University of Washington, Technical Report Apr. 1, 2003, Jan. 15, 2004.

Bjorn et al., "PunkBuster for Server Administrators—America's Army Edition," Nov. 11, 2004, Even Balance, Inc. <http.//www.punkbuster.com/publications/aa-ad/index/htm>.

Cronin, et al., "Cheat-Proofing Dead Reckoned Multiplayer Games (Extended Abstract)." In Proc. ADCOG 2003, Jan. 2003. <http://warriors.eecs.umich.edu/games/papers/adcog03-cheat.pdf>.

Delap, et al., "Is Runtime Verification Applicable to Cheat Detection?" Aug. 30+Sep. 3, 2004, SIGCOMM '04 Workshops. <http://conferences.sigcomm.org/sigcomm/2004/workshop_papers/net606-delap1.pdf>.

World of Warcraft Terms of Use, Oct. 27, 2004, Blizzard Entertainment <http://web.archive.org/web/20050304021845/www.worldofwarcraft.com/legal/termsofuse.html>.

World of Warcraft—Game Manual, 2004, Blizzard Entertainment <http://www.replacementdocs.com/download.php?view.2488>.

U.S. Appl. No. 14/101,870, Adam P. Harris, Managing Game Metrics and Authorizations, filed Dec. 10, 2013.

U.S. Appl. No. 14/149,545, Adam P. Harris, Defining New Rules for Validation Network Devices, filed Jan. 7, 2014.

Emons, Winand "Escalating Penalties for Repeat Offenders," Oct. 2003.

"First Pit and Heartfelt . . . about Game Zone cheaters [Archive]—Straight Dope Message Board," Jun. 2, 2003, Straight Dope, available at ,http://board.straightdope.com/sdmb/archive/index.php/t-188189.html.>.

Lomont, Chris "Secure Channel Communication," 2009, retrieved from <http://www.lomont.org/Math/Papers/2009/Securec%20Channel%20Communication.pdf.

Rojas, Peter "Microsoft Locks Modded Xboxes out of Xbox Live," Nov. 11, 2004, Engadget.

PCT/US11/35587, International Search Report and Written Opinion mailed Aug. 9, 2011.

PCT/US07/006628, International Search Report and Written Opinion mailed Sep. 12, 2008.

(56) References Cited

OTHER PUBLICATIONS

Office Action for U.S. Appl. No. 13/098,470 mailed Aug. 1, 2013.
Final Office Action for U.S. Appl. No. 13/098,470 mailed Aug. 6, 2012.
Office Action for U.S. Appl. No. 13/098,470 mailed Feb. 22, 2012.
Final Office Action for U.S. Appl. No. 13/252,150 mailed Dec. 17, 2012.
Office Action for U.S. Appl. No. 13/252,150 mailed Jun. 7, 2012.
Chinese Application No. 201180063916.6 Office Action dated Jan. 6, 2015.
Ferretti et al., Stefano; "AC/DC: an Algorithm for Cheating Detection by Cheating", Proceedings of the 2006 International Workshop on Network and Operating Systems Support for Digital Audio and Video, NOSSDAV 2006. Jan. 1, 2006.
Ferretti et al., Stefano; "Game Time Modelling for Cheating Detection in P2P MOGs: a Case Study with a Fast Rate Cheat." Proceedings of 5th ACM Sigcomm Workshop on Network and System Support for Games, NETGAMES 2006, Jan. 1, 2006.
Mizrak et al., Alper T.; "Detecting Malicious Packet Losses", IEEE Transactions on Parallel and Distributed Systems, vol. 20, No. 2, Feb. 1, 2009.
"RTP, Real-Time Transport Protocol", http://www.networksorcery.com/enp/protocol/rtp.htm Date of download: Apr. 22, 2015.
Extended European Search Report for EP 11838378.5 mailed May 4, 2015.
Japanese Application No. 2013-537662 Notification of Reasons for Refusal Mar. 31, 2015.
U.S. Appl. No. 14/313,553 Office Action mailed Dec. 30, 2015.
Extended European Search Report for EP 07753269.5 mailed Oct. 6, 2011.
Examination Report for EP 07753269.5 mailed Aug. 19, 2015.
U.S. Appl. No. 14/101,870 Office Action mailed Apr. 22, 2016.
U.S. Appl. No. 14/313,553 Final Office Action mailed Jul. 25, 2016.
U.S. Appl. No. 14/313,553 Final Office Action mailed Dec. 1, 2016.

\* cited by examiner

DETECTING LAG SWITCH CHEATING IN GAME

BACKGROUND OF THE INVENTION

Field of the Invention

The present invention generally relates to network gaming and more particularly to detecting lag switch cheating in a network game.

Description of Related Art

Conventionally, users of electronic games compete with one another by selecting a two-player option associated with a particular electronic game via a single home gaming console. Accordingly, two players can play at the same time or one-at-a-time in order to compete for points or other awards associated with the particular electronic game.

As electronic game consoles have become more popular and network technologies have become more pervasive, more options for head-to-head competition have become available. Some electronic game consoles are equipped with modems or other network connectors for allowing users to communicate over a network through the exchange of data related to the game. By communicating over a network, users can connect to various other users' gaming consoles either directly or via intermediate computing nodes (e.g., a central server or other game consoles in a network) and compete against those various other users while playing a network game.

Disadvantageously, some users manipulate the network game in order to gain unfair advantages while competing with other users playing the same network game. For example, a user may delay the rate at which the user's data is sent to other users so that the various other users do not receive the user's data in time to react appropriately. Unscrupulous game players may introduce this delay in transmission of game play data through a lag switch.

Adding latency to the network through a lag switch has the effect of making the cheater's online game character appear to be at an old location (or invisible). In reality, the cheater may have positioned his online game character near an opponent. The cheater—now being strategically positioned—may kill his opponent and/or subsequently enable the normal flow of network traffic and continue with unabated game play.

Utilizing lag switch cheating is especially problematic in networked 'community' game-play. Pervasive cheating in a gaming community decreases user enjoyment of participating in a networked community game environment. For example, a particular user playing a network game without any illicit outside aides such as a lag switch is at a distinct disadvantage versus a user who is making use of such illicit aides. The user who is not cheating may be overpowered, outgunned, or otherwise inferior in some respect to a user who is cheating regardless of the individual skills of those users. If the user who does not cheat is continually defeated by a user who does cheat—and often in quick and decisive fashion—the non-cheating user may lose interest in a particular game, a particular game network, or a particular product or service provider.

This loss of interest adversely affects game developers and network service providers who will sell fewer game titles or find fewer users utilizing their network game services, respectively. As such, there is an inherent interest for game developers, service providers, and honest game users to identify and eliminate cheating in a network or community game environment.

SUMMARY OF THE INVENTION

In one claimed embodiment, a method for detecting lag switch cheating in a gaming network is disclosed. The method includes receiving data packets from a client. The data packets have tracking data including a sequence number and/or a time stamp. The tracking data is monitored whereby it is determined whether a cheat-detection event has occurred.

In a second claimed embodiment, a system for detecting lag switch cheating is disclosed. The system includes a computing device that receives data packets from a client. The data packets have tracking data including a sequence number and/or a time stamp. A monitoring module is executed to monitor the tracking data. An analysis engine is determines, from the monitoring of the tracking data, whether a cheat-detection event has occurred.

In another claimed embodiment, a non-transitory computer-readable storage medium is disclosed. Embodied upon the medium is a program. The program is executable by a computing device to perform a method for detecting lag switch cheating in a gaming network. The method includes receiving data packets from a client. The data packets have tracking data including a sequence number and/or a time stamp. The tracking data is monitored whereby it is determined whether a cheat-detection event has occurred.

DETAILED DESCRIPTION

Figure 1:
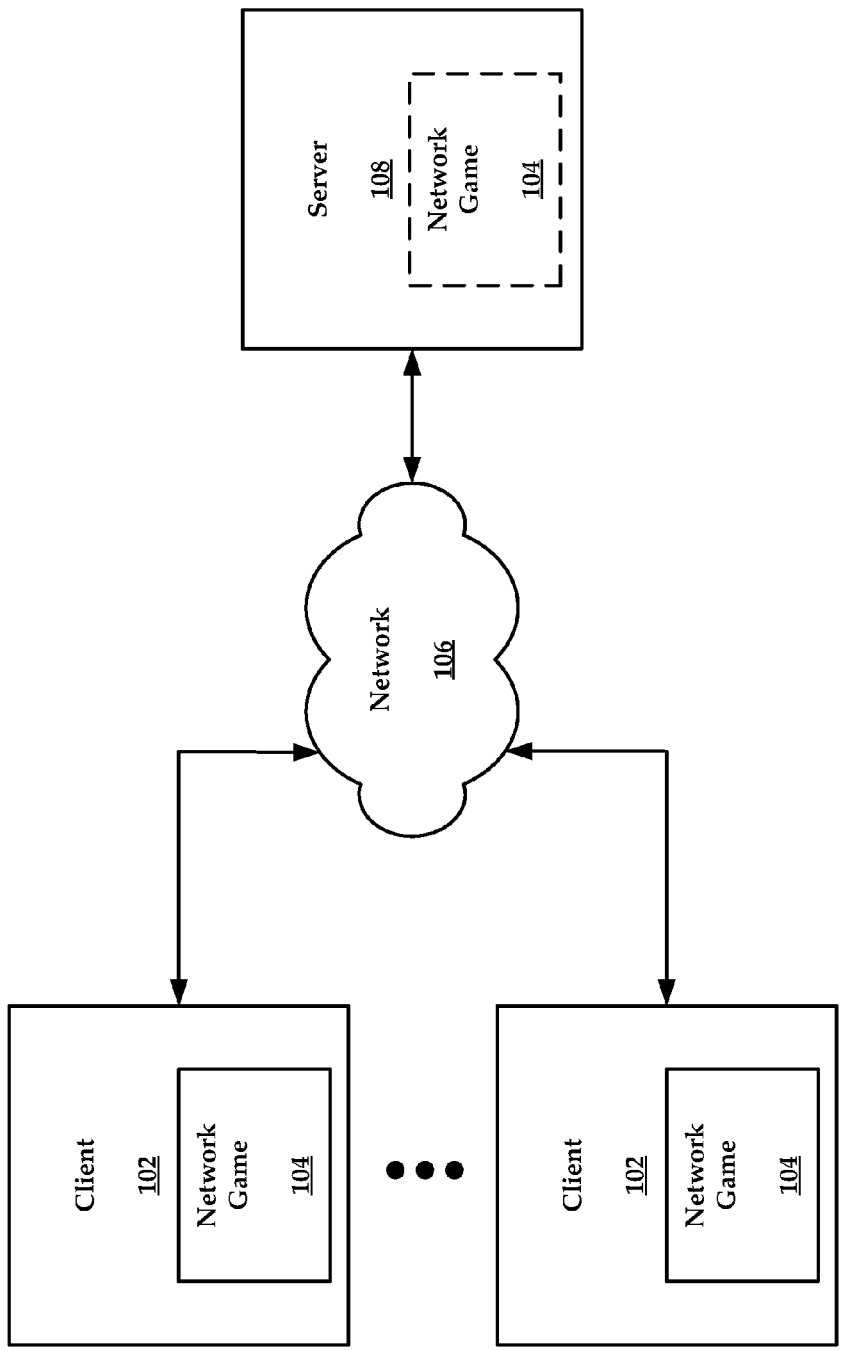
FIG. 1 illustrates exemplary network architecture for validating network game users.

FIG. 1 illustrates exemplary network architecture for validating network game users. The elements identified in FIG. 1 may include various alternatives, equivalents, or derivations thereof. One or more clients 102 may include one or more network games 104. Network game 104 may be built-in (e.g., pre-loaded) to the client 102 or be introduced through an optical disk or other data storage medium. Network game 104 may also be obtained over a network. The client 102 may be connected to a server 108 via a communications network 106 or to one another through an ad hoc network.

The client 102 may comprise a game console such as a PlayStation® 3, a laptop computing device, a portable game device such as the PlayStation® Go, a desktop computing device, a Smart Phone, or any other device capable of executing the network game 104 and connecting to either the network 106 or ad hoc network. In some embodiments, the client 102 may be identified by an identification number such as a client ID or an address mechanism such as an IP address. In other embodiments, a user of the client 102 may 'sign on' to a network with a user name and/or password, which may be temporarily or permanently associated with the client 102.

The server 108 may include the network game 104 and the clients 102 may access the network game 104 on the server 108 via the network 106. The network game 104 on the server 108 may be the entire game, a portion of the game, data related to the game or simply a node allowing for the pass though, observation and/or collection of data related to the game 104 as the game 104 is played by users in the game community. The network game 104 may be similarly organized at various clients 102 (e.g., portions of the game or game data related to the game). Network game 104 may also be provided through a third-party content library server. The library server may or may not be a participating member of the presently disclosed validation architecture.

It should be understood that the reference to a client 102 and a server 108 is merely for the convenience of understanding various embodiments of the present invention. Embodiments of the present invention may be implemented in the context of a peer-to-peer network, a client-server network, or within a peer-group (e.g., a specified group of peers). A client may, therefore, function as a server and vice versa depending on the timing and the nature of a data exchange. For example, various clients in a peer-to-peer network may each comprise a portion of a network game 104 or data related to that game 104 and may send and receive the same. As such, any reference to a client or a server is meant to be inclusive of operations performed by one or both computing entities unless specified otherwise by a specific limitation in the claims. In some instances, a device with client/server functionality may be referred to by the generic moniker, 'network node,' 'computing node,' or 'network device.' In that regard, client 102 and server 108 may both be considered network or computing nodes or a network device.

The network game 104 may include software processed on or by the client 102 and/or that allows for or facilitates communication and data exchanges with the other clients 102 and server 108 via the network 106. The network 106 may include, for example, the Internet. Other proprietary or closed networks may be used either exclusively or in conjunction with the Internet. Certain security protocols or encryption methodologies may be used to ensure the security of data exchanges over network 106, especially if the network 106 is a publicly accessible network such as the Internet. Users associated with each of the clients 102 may interact with other users playing the network game 104 despite not being physically present with one another or sharing a common gaming device or console.

In one exemplary embodiment, the server 108 may monitor the users playing the network game 104 via the network 106. The clients 102 may request data from the server 108, such as information pertinent to the particular network game 104 being played, bug patches, and so forth. Any type of communication exchange between the clients 102 and the server 108 is within the scope of the various embodiments of the present invention. Further, in some embodiments of the present invention, more than one server 108 may be connected to the network 106 for the purpose of communicating with the clients 102. For example, back-up or redundancy servers as well as servers with particular tasks such as storing identification information or preferences related to a particular user as well as servers tasked with certain DRM, advertising, or payment responsibilities.

In other embodiments of the present invention, the clients 102 may monitor the network games 104 being played by the other clients 102 (e.g., as individual nodes in a peer-to-peer network or peer-group network). The clients 102 may communicate data generated during the monitoring process to the server 108 or the clients 102 may store and process the data themselves. For example, in a peer-to-peer network scenario, each of the nodes in the network may monitor other nodes in the network for certain illicit behaviors such as lag switch cheating.

Figure 2:
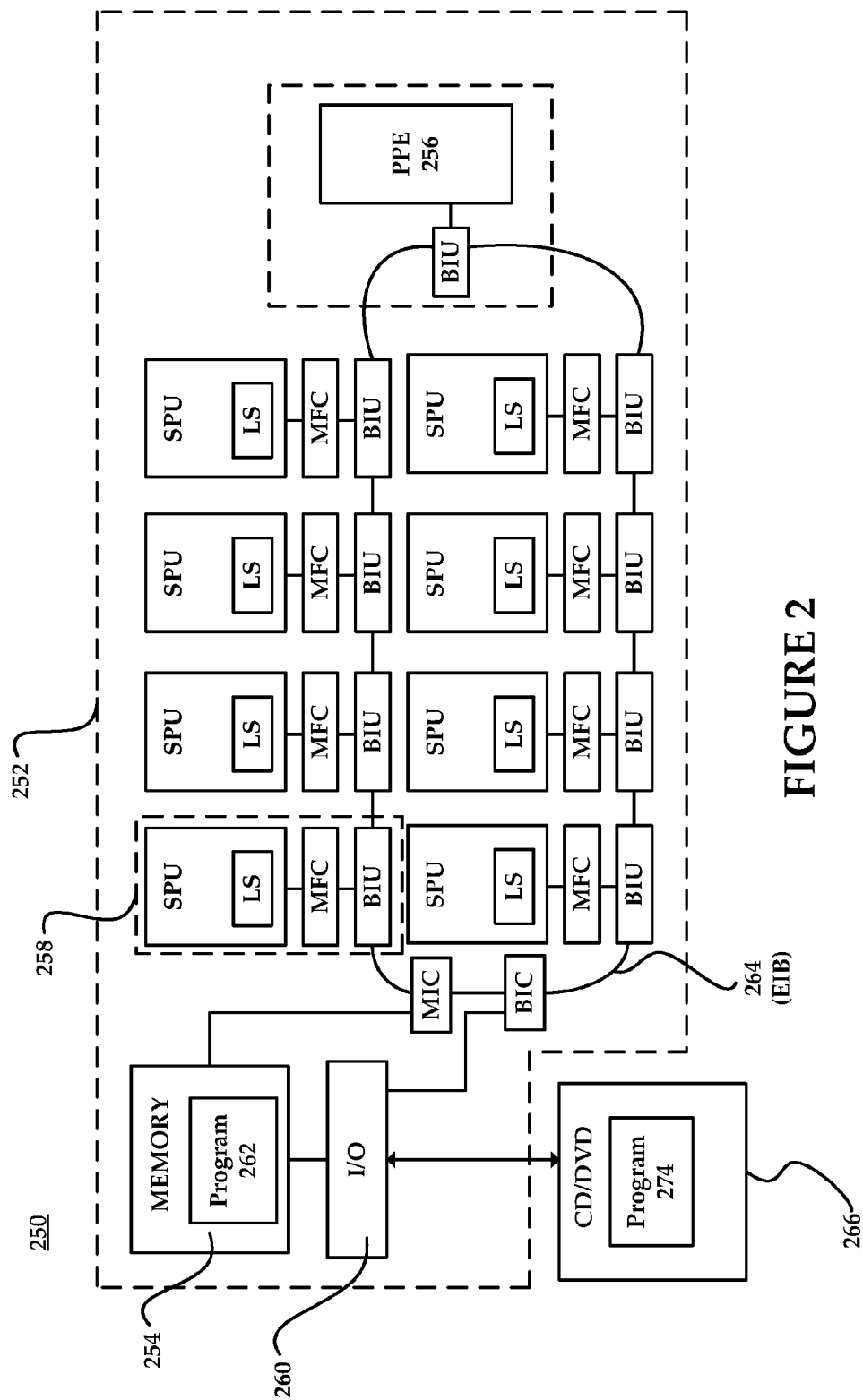
FIG. 2 is a block diagram of an exemplary electronic entertainment system including a control processor, multiple processing units, and a multitude of local memories and that may be used in implemented embodiments of the presently claimed invention.

FIG. 2 is a block diagram of an exemplary electronic entertainment system 250 including a control processor, multiple processing units, and a multitude of local memories and that may be used in implemented embodiments of the presently claimed invention. The electronic entertainment system 250 illustrated in FIG. 2 is, specifically, one based on a Cell processor 252, which is a joint development of Sony Computer Entertainment Inc., Kabushiki Kaisha Toshiba, and International Business Machines Corporation. Certain aspects of the Cell processor are disclosed in U.S. patent publication number 2002-0138637 for a "Computer Architecture and Software Cells for Broadband Networks," the disclosure of which is incorporated herein by reference. The system 250 may constitute a component of client 102 (or any other computing node in the network 106) and for playing the network game 104. The elements identified in FIG. 2 are exemplary and may include various alternatives, equivalents, or derivations thereof.

Through the use of the aforementioned Cell processor, data and applications may be processed and packaged into uniquely identified and uniformly formatted software cells. The uniformity of structure and unique identification facilitates the processing of applications and data throughout a network of Cell processor equipped computing devices. For example, one computing device may formulate a software cell but can distribute that cell to another device for processing. Thus, the cells may migrate throughout a network for processing on the basis of the availability of processing resources on the network.

The cell processor 252, as illustrated in FIG. 2, includes a main memory 254, a single power processor element (PPE) 256 and eight synergistic processor elements (SPE) 258. The cell processor 252 may be configured, however, with more than one PPE and any number of SPEs 258. Each SPE 258 comprises a synergistic processor unit (SPU) and a local store (LS).

Memory 254, PPE 256, and SPEs 258 may communicate with each other and with an I/O device 260 over, for example, a ring-type-element interconnect bus (EIB) 264 coupled to a bus interface controller (BIC). The PPE 256 and SPEs 258 may access the EIB 264 through bus interface units (BIU). The PPE 256 and SPEs 258 may access the main memory 254 over the EIB 264 through memory flow controllers (MFC) and memory interface controller (MIC).

Memory 254 may comprise a program 262 that implements executable instructions. The instructions may be read from a CD/ROM or other optical disc in CD/DVD reader 266 coupled to the I/O device 260, the CD/ROM or other optical disc being loaded into the reader 266. The CD/ROM, too, may comprise a program, executable instructions, or other data 274.

PPE 256 may be a standard processor capable of standalone processing of data and applications. PPE 256 may schedule and orchestrate the processing of data and applications by SPEs 258 and the associated SPU. The SPU may be a single instruction, multiple data (SIMD) processor. Under the control of PPE 256, the SPUs may process data and application in a parallel and independent manner. MIC may control accesses by PPE 256 SPUs to data and applications in main memory 254.

A user of the system 250 may provide instructions via a controller interface (not shown), which may be coupled to a control device comprising, for example, a joystick, directional buttons, and/or other control buttons. For example, the user may instruct the system 250 to store certain game information on a memory card, which may be removable (e.g., a flash memory or other non-volatile memory card), or may instruct a character in a game to perform some specified action. Other devices may be connected to the system 250 via a USB or IEEE 1394 interface, such as an external hardware device allowing for illicit gaming behavior (i.e., cheating).

Some embodiments of the system 250 may comprise a network adaptor configured to provide the hardware functionality necessary for the system 250 to connect to a network. The network adaptor may include an Ethernet connection 242. Through an Ethernet connection, a network cable (e.g., a 100 Base-TX or 10-Base T) may be coupled to the network adaptor for connection to a network. The network cable may, for example, be communicatively coupled to a DSL or cable modem. The network cable may also be communicatively coupled to, for example, a router via a LAN port; the router may then be coupled to a DSL or cable modem through a WAN port.

In addition, or alternatively, the Ethernet connection may allow for a network cable to be connected to a wireless Ethernet bridge. The wireless Ethernet bridge may be communicatively coupled to a wireless router utilizing, for example, an 802.11x protocol. The wireless router may be further communicatively coupled to a cable or DSL modem. In some instances, a wireless processor or other wireless network access device may be embedded within system 250.

Figure 3:
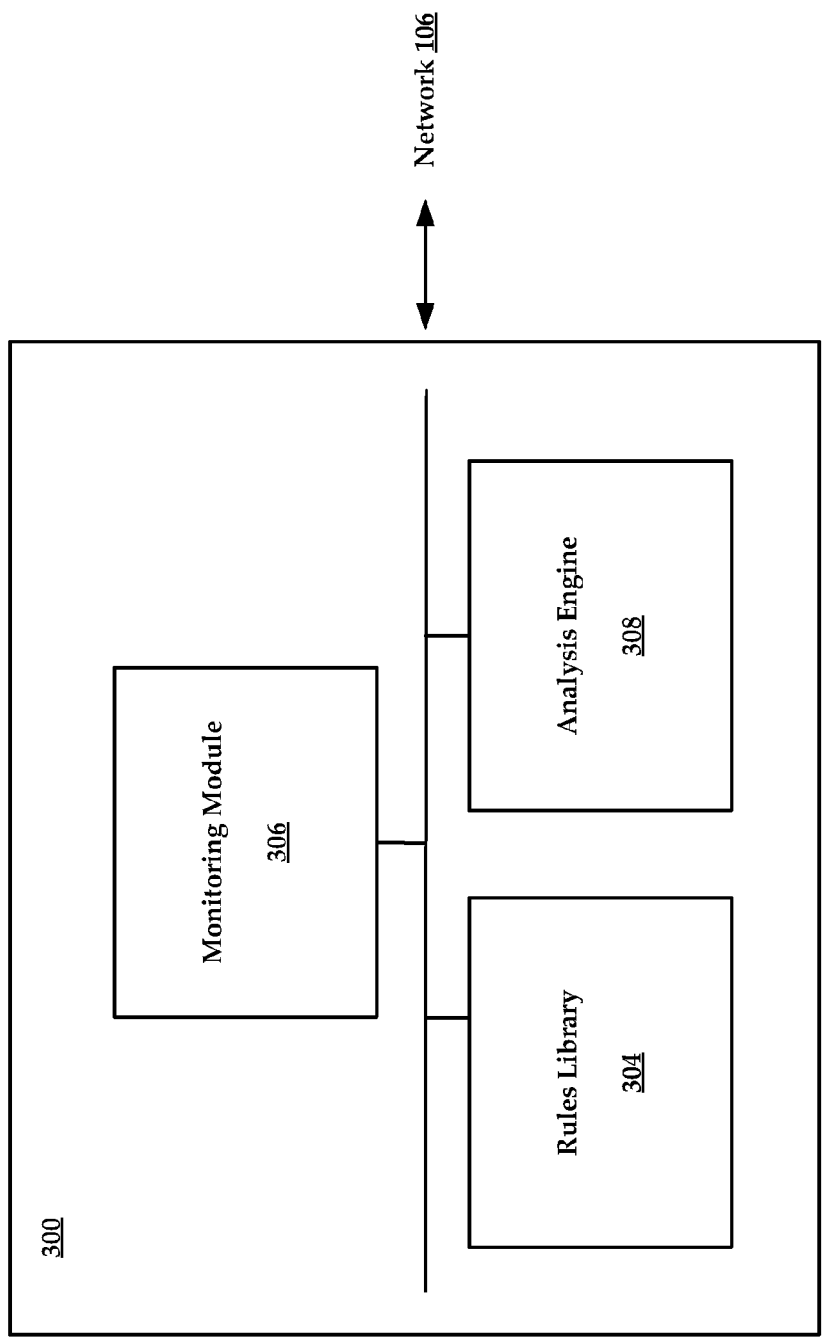
FIG. 3 is a lag detection module that may implement the lag detection methodology of FIG. 4.
Figure 4:
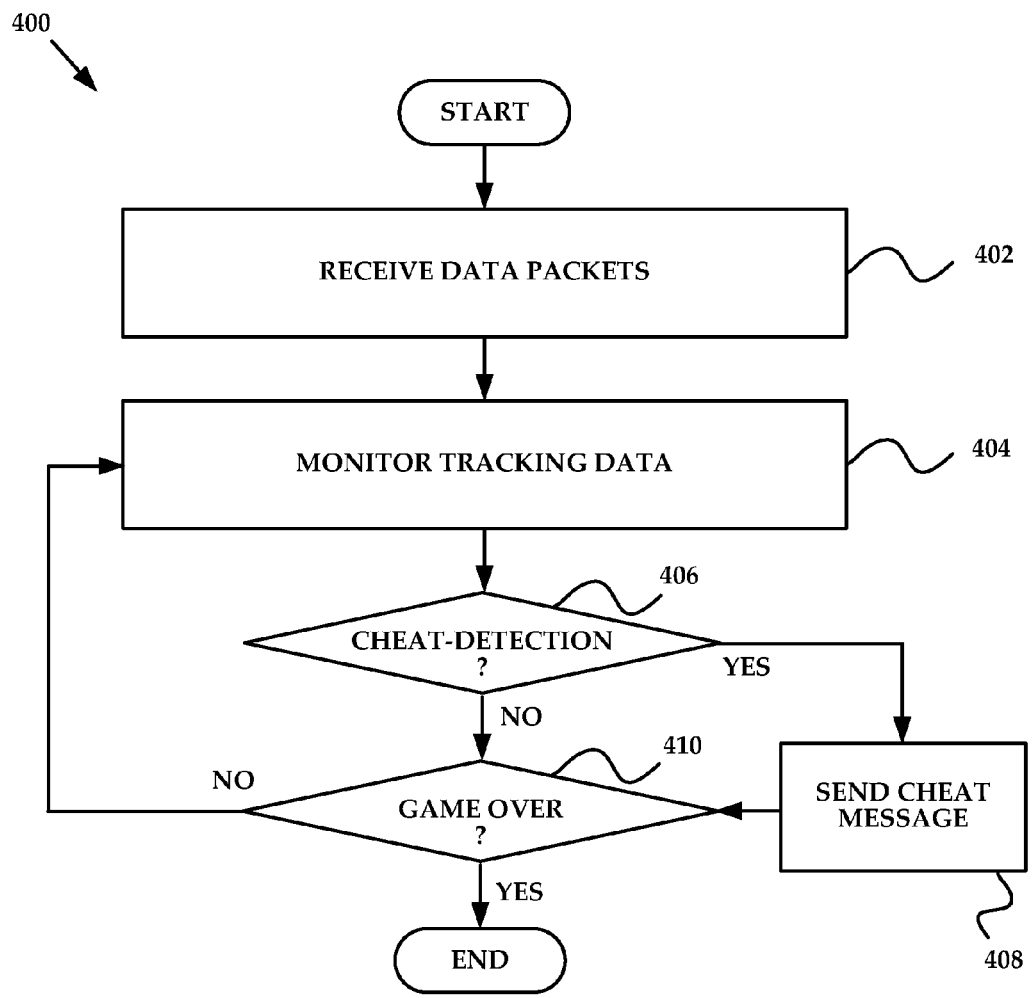
FIG. 4 is a flow diagram of an exemplary process for detecting lag switch cheating.

FIG. 3 is a lag detection module 300 that may implement the lag detection methodology of FIG. 4. The elements identified in FIG. 3 are exemplary and may include various alternatives, equivalents, or derivations thereof.

Rules library 304 encompasses rules and data concerning various identifiable aspects of the gaming environment or the hardware and/or software related to generating that environment, including information related to network latency. Rules may be independently generated by a game developer or provided through a system or network administrator. Rules may likewise be generated through monitoring of network conditions by monitoring module 306 thereby developing a rule based on its observations of a particular network game 104.

A rules library 304 may be provided for storing the pre-defined or generated rules. Rules may be embodied in any variety of file and/or data types and the present invention does not seek to impose or otherwise limit the implementation of the same. Various other data may be stored in the rules library 304 according to some embodiments of the present invention. For example, statistics about one or more users of the network game 104 may be stored in the rules library 304, or any other storage medium or locale, according to some embodiments of the present invention. Alternative storage of statistics or other information may occur remotely from a network node but is otherwise accessible via the network 106.

A monitoring module 306 may be configured to monitor user activity with respect to the network game 104 at the client 102 via data exchanges with the server 108 via the network 106. Any type of monitoring may be implemented by the monitoring module 306 (e.g., periodic review of data exchanges, constant review of data exchanges, review of data exchanges from particular nodes, etc.). According to one embodiment of the present invention, the monitoring module 306 may utilize rules in the rules library 304 and analysis provided by the analysis engine 308 to passively listen for or detect user activity that deviates from typical user activity associated with the network game 104 or that might suggest the presence of such activity, including lag switch cheating.

In some embodiments, the monitoring module 306 may be located in particular client nodes within the network. For example, a particular network game 104 (e.g., one distributed on a CD-ROM) may include certain aspects of a validation system and related software embedded with the game software. As such, any client 102 in the network 106 may possess validation functionality in addition to a server 108.

A client 102 with validation software (e.g., monitoring module 306) may operate by itself or may operate in conjunction with the server 108 to ensure valid game play in the network. Client 102, in one embodiment, may possess the monitoring module 306 and rules library 308 in addition to other possible aspects of the validation architecture illustrated in FIG. 3 through a particular network game 104 title. As such, the client 102 may observe another client 102 in the network. If the monitoring module 306 observes illicit behavior through a data exchange with another client 102 in the network 106 (as might be identified through particular rules in the rules library 304 and/or determinations by the analysis engine 308), the client 102 observing such illicit behavior may take certain action in response to the illicit behavior.

Alternatively, the valid client may report the invalid client to the server 108 and the server 108 may engage in more detailed analysis of the purportedly illicit behavior through. The server 108 may also engage in certain behavior designed to maintain the integrity of the gaming network such as dismissing the invalid client, overwriting invalid code through a pushed update, maintain a record of the invalid client and its related user and so forth. These various integrity maintenance actions may also be executed by client 102 (e.g., dismissals) or by client 102 in response to an instruction or request by the server 108.

By sharing and/or distributing validation responsibilities, bandwidth consumption and processing power of the server 108 may be alleviated and possibly avoids the involvement of an additional computing device in the validation relationship. That is, one client 102 may validate another and vice-versa through the course of regular data exchanges instead of using the server 108 as a validating intermediary.

Validation may also occur amongst a plurality of clients 102 in the network 106. For example, a first client 102 may engage in monitoring for a particular period of time with those responsibilities then taken over by a second client 102 at a later time. By randomly reassigning monitoring responsibilities (e.g., via server 108), more adept cheaters that may be able to avoid detection by a single monitoring entity must now deal with a constantly random and reassigned monitoring entity or entities.

Certain embodiments may also make use of group validation wherein a particular client 102 must be validated by two or more other clients 102 in order for that client 102 to be deemed valid or invalid. Group validation may occur in conjunction with the server 108 whereby the server may take into account the validation information from the group of clients 102 and make an ultimate determination as to whether game play is allowed to continue for that particular client 102. One of the one or more clients 102 participating in the group validation may alternatively be assigned lead validation responsibility and take appropriate action in response to generated validation information. Leadership responsibilities may also be distributed amongst the members of the group wherein the group acts collectively or certain client 102 members of the group carry out designated responsibilities.

Reassignment of monitoring responsibilities may also make use of client 102 with idle processing and bandwidth. For example, a client 102 might be connected to the network 106 but is not actively playing a game 106 or is currently in a 'waiting room' or 'game lobby' awaiting entry into a particular game 106. The available processing power of that otherwise idle client 102 may then be put to use through validation assignments or actual validation activity.

In alternative embodiments, a client 102 may download certain information from the server 108 such as rules or updates for the rules library 304 that may be only partially embedded with the game software of a network game 104. These updates or downloaded libraries may be temporarily stored in, for example, main memory 210 or a memory card 218. Rules updates or other related downloads may occur as a part of a regular schedule as determined by the server 108, as a part of a query by a client 102 to the server 108 for any variety of information, or during an initial log-on process wherein user names and passwords might be verified and that otherwise indicate the allowed permission of a particular user or client 102 in the network 106. The monitoring module 306 may observe activity in the network game 104 violating rules related to network latency and indicative of lag switch cheating.

The monitoring module 306 may forward any flags or unusual activity to the analysis engine 308. The analysis engine 308 may analyze the flagged activity to determine whether the activity is, in fact, illegal with respect to the game environment constraints of the network game 104. In other words, the analysis engine 308 determines whether the user activity, in fact, violates the rules associated with the network game 104.

The monitoring module 306 may receive data from the network game users as the network game users interact with the network game 104. For example, the client 102 may periodically post data to the server 108 or to the other clients 102 related to the network game 104 and/or the network game user's interaction with the network game 104. The monitoring module 306 reviews (e.g., 'listens to') the data as it is posted in order to determine whether the network game user associated with the client 102 that posts the data is cheating and/or failing to adhere to the one or more rules associated with the network game 104, as defined by the rules library 304. In an exemplary embodiment, the monitoring module 306 may forward the posted data to an analysis engine 308 and the analysis engine 308 analyzes and/or evaluates the posted data in light of rules from rules library 304 to determine whether the network game user 104 associated with the client 102 that posts the data is cheating and/or failing to adhere to the one or more rules associated with the network game 104.

If the analysis engine 308 determines that the user is cheating, the offending node may be ejected, allowed to continue playing, and so forth. In some embodiments, the server 108 or sending node may resolve the violation (i.e., cheating activity) whereby various types of resolution may be employed. In some embodiments of the present invention, the node tasked with resolving the behavior (e.g., server 108) may disable a cheating device or offending code presently running on the system 250 by sending a patch to remove, modify, or add to the offending software (e.g., a computing device tasked with maintaining community integrity delivers a command to the offending node whereby the offending node is instructed to modify its own memory at a specified location and to a specified value).

In some embodiments, the analysis engine 308 may generate a list of users or client devices 102 that violate the rules associated with the network game 104. In other words, the analysis engine 308 may generate a cheater 'rap sheet.' The cheating users may then be monitored more often by the monitoring module 306 according to some embodiments or employed as a variable for generating future rules.

In some embodiments, the client 102 may include certain or all of the components discussed in FIG. 3 with regard to server 108 whereby device becomes more of a generic network node that may encompass server functionality, client functionality, both or neither (e.g., a router, buffer or intermediate point on a network). Accordingly, the client 102 can detect cheating activity occurring on other clients 102, as discussed herein.

Nodes may also act in peer-groups whereby, for example, ten particular nodes constitute a group. Groups may be defined by the particular needs or nature of a particular network environment. For example, a group may constitute all players of a network game 104. A group may constitute all players of a network game 104 and participating via a particular ISP. A group may also constitute players in a certain 'game room,' that is, players that have been invited to participate with one another or otherwise entered a particular gaming environment of particular users. A group may be defined by any parameter that allows for delineation of one user from another (e.g., age, experience, game device being used, time logged on, type of network connection, bandwidth availability, etc.).

Other embodiments may provide for group participation in analysis of certain behavior. For example, multiple nodes (via monitoring module 306) may observe behaviors from a particular node. The behaviors observed may be identical or each involving different game behavior information. In some embodiments, an approval (e.g., validation) of same or varying behaviors as observed by various nodes may be required by all or a certain percentage of the observing nodes to further ensure the validity of the observed node in the community network.

Furthermore, although various components are discussed in connection with FIG. 3, the server 108 and/or the client 102 may include more or fewer components and still fall within the scope of various embodiments of the present invention. For example, responses to illicit behaviors may be carried out by a separate integrity module (not shown) in conjunction with or independent of, for example, analysis engine 308 as referenced above.

FIG. 4 is a flow diagram of an exemplary process 400 for detecting lag switch cheating. Although FIG. 1 depicts a client-server environment, the methodology of FIG. 4 may be implemented in a peer-to-peer environment. It should also be noted that computing nodes implemented in the context of the methodology of FIG. 4 may include hardware and/or software and/or firmware including various executable modules and engines.

The steps identified in FIG. 4 (and the order thereof) are exemplary and may include various alternatives, equivalents, or derivations thereof including but not limited to the order of execution of the same. The steps of the process of FIG. 4 (and its various alternatives) may be embodied in hardware, firmware, software, or a combination thereof, including a non-transitory computer-readable storage medium (e.g., optical disc or memory card). Said storage medium may comprise a program or instructions executable by the processor of a computing device.

At step 402, data packets are received from a client 102 by a computing device, such as the server 108. In a peer-to-peer embodiment, the data packets may be received by one or more of the clients 102 and/or the server 108. A plurality of the data packets have tracking data contained therein. The tracking data may include at least one of a sequence number and a time stamp. In some embodiments, the sequence numbers and/or time stamps may be encrypted. This may, for example, prevent cheaters from manipulating the tracking data.

At step 404, a monitoring module, which is stored in memory, is executable by a processing device to monitor the tracking data. The monitoring module may monitor one or more devices, such as clients 102, interacting with a network game 104. The monitoring module may keep track of the sequence numbers and time stamps (i.e., the tracking data) of the data packets.

At step 406, an analysis engine operates to determines, from the monitoring of the tracking data, whether a cheat-detection event has occurred. The analysis engine identifies one or more indicia of violation of one or more rules that define fair game play, including aberrant lag time, which may be flag a user associated with a cheat-detection event.

The analysis engine may analyze sequence numbers of data packets to detect data packet loss. Packet loss occurs when at least one data packet traversing a network fails to reach its intended destination. The analysis engine may analyze time stamps of data packets to detect changes in latency. 'One-way latency' is the time from the source sending a packet to the destination receiving the packet. 'Round-trip latency' is the time from source to destination plus the one-way latency from the destination back to the source. The instant system may detect packet loss, changes in latency, or both.

As mentioned, the analysis engine may analyze sequence numbers of data packets to determine packet loss (i.e., if data packets are missing). For example, a data packet received at the server 108 from a given client 102 may have a sequence number of S (where S represents an integer) associated therewith. The next highest sequence number received at the server 108 may be S+200. If the intermediate data packets are not received at the server 108 then this may be evidence that a cheater is intentionally causing packet loss.

The analysis engine may analyze time stamps of data packets to determine if additional latency has occurred on the network, as mentioned. The analysis engine may determine this by observing if and when there are changes in the deltas between the time stamps of packets leaving different clients 102. Changes in latency might indicate that a cheater is intentionally slowing, delaying, or stopping network traffic. In some embodiments, for example in a peer-to-peer configuration, monitoring and analyses may be performed within the clients 102. In some embodiments, for example in a client-server configuration, monitoring and analyses may be performed at the server 108.

A cheater may cheat in this manner by use of, for example, a lag switch. The cheater may stop or delay his send traffic, both his send and receive traffic, and so forth. In a peer-to-peer configuration, other users may flag suspicious activity that could be indicative of cheating. Network states may be recorded in a buffer. When a predetermined number (one or more) of players flag a suspected cheater, then the information may be sent to a moderator who may examine the evidence and possibly take action (such as penalizing the suspected cheater). In another embodiment, these actions may be performed automatically. In a client-server configuration, the server 108 may aggregate data from various clients 102 in order to perform analysis of the data.

The analysis engine analyzes the tracking data of one or more data packets with respect to various thresholds. When a threshold has been met, it then may be determined that a cheat-detection event has occurred. Exemplary thresholds may include 60 packets lost, three seconds of no network traffic, 10 seconds of added latency, and so forth. However, these numbers are only examples and any suitable threshold(s) are contemplated in various embodiments according to the present technology. Sometimes these thresholds may be dependent on the specific game.

If a determination has been made that a cheat-detection event has occurred, then the process proceeds to step 408. If no determination has been made that a cheat-detection event has occurred at step 408, then the process proceeds to step 410.

At step 410, the clients 102 associated with other players in the network game 104, and/or the server 108, may send a cheat message to the user suspected of cheating. A cheat message may be sent to the network game 104 of the client 102 associated with the suspected cheater signifying that he is suspected of cheating.

After the network game 104 of the suspected cheater has received a cheat message, the cheater's network game 104 may initiate a callback in the network game 104 so that the network game 104 may decide how to proceed. The suspected cheater may be penalized in some fashion. For example, a "Network Interrupted" icon or the like may be placed on the suspected cheater's screen. The suspected cheater's game character may be moved back to its pre-lag location or last good location where no cheating was detected. The system may stop accepting input from the suspected cheater for N number of seconds, where N may be any real number. When a given number of callbacks, X, have been initiated then the network game 104 may disconnect the suspected cheater from the network game 104. X may be any integer greater than or equal to one. Different games may have different types of penalties and thresholds for detecting cheating. Any suitable penalty is within the scope of various embodiments according to the present technology. After step 408, the process proceeds to step 410.

At step 410, a determination is made as to whether the network game 104 is over. If the network game 104 has ended then the process ends. However, if the network game 104 has not ended then the process returns to step 404.

It is noteworthy that many games are continually sending network traffic (even for a character that is presently motionless in the game). However, other games do not continually send network traffic in such a scenario. One might erroneously misinterpret this latter scenario to be indicative of packet loss. Other games send network traffic at set intervals. The present technology, by use of time stamps and sequence numbers, advantageously works with all types of games.

As discussed herein, embodiments the methods for detecting lag switch cheating may be applied to a peer-to-peer environment or a client-server environment. Various modules and engines may be located in different places in various embodiments. For example, the monitoring module and/or the analysis engine may be located at one or more clients 102 in some exemplary embodiments.

In various embodiments according to the present invention, determination of whether a game player is engaged in lag switch cheating may occur through a particular client device (e.g., a gaming system) regularly reporting game data to, for example, a central game server (like server 108 of FIG. 1) or another game player's network device (like client 102 of FIG. 1). Analysis of that game data may take place as the game data is processed by the appropriate network device. For example, game data generated by one player may be analyzed by an opposing player's client with regard to abiding by particular game metrics as the first game player's game data is processed for display on the opposing player's gaming device. Similar analysis may take place at a central server prior to the game data being sent by the central server to another game player or players.

While various embodiments have been described above, it should be understood that they have been presented by way of example only, and not limitation. For example, any of the elements associated with the client 102, the network game 104, and/or the server 108 may employ any of the desired functionality set forth hereinabove. Thus, the breadth and scope of a preferred embodiment should not be limited by any of the above-described exemplary embodiments.

The present invention may be further implemented in a common network game 104 that is operable over a mixed network of end user devices (e.g., clients 102). For example, one client device 102 may be a personal computer; a second client device 102 may be a home entertainment system such as a PlayStation®2 or PlayStation®3 available from Sony Computer Entertainment Inc. Another client device 102 may be a portable gaming device such as a PSP™ (also from Sony Computer Entertainment Inc.) whereas a fourth client 102 may be a home entertainment system of a different manufacture such as an Xbox as manufactured by Microsoft Corporation or Wii as manufactured by Nintendo Co., Ltd. The present anti-cheat methodologies described herein are fully intended to be operable amongst a related or non-related group of devices. It is noted that embodiments according to the present invention are not limited to anti-cheat methodologies.

What is claimed is:

1. A method for detecting cheating in a gaming network, the method comprising:
   generating a first set of rules, wherein the first set of rules define acceptable user activity in a gaming network, and wherein the generated rules are defined based on observations of a performance of the gaming network;
   receiving data packets from a client in the gaming network, wherein the data packets are received at a network interface communicatively coupled to the gaming network and have tracking data that includes at least one of a sequence number or a time stamp indicating the progression of a game character through a game environment in the gaming network, and wherein the received data packets correspond to user activity for the client in the gaming network;
   monitoring the user activity for clients that may violate the generated first set of rules, wherein the user activity is monitored in response to execution of a monitoring module by a processor, and wherein the monitoring module is stored in memory; and
   determining that a client violated the generated first set of rules thereby identifying the client as a deviant client, wherein the determination that the client violated the generated first set of rules includes:
      identifying one or more pre-defined thresholds corresponding to indicia for changes in deltas between tracking data of data packets associated with the client and tracking data of data packets associated with different clients;
      determining that there are changes in deltas between tracking data of data packets associated with the client and tracking data of data packets associated with different clients;
      detecting that the determined delta changes between the different clients in view of the delta changes with the client exceeds one or more of the pre-defined thresholds used to identify cheating; and
      identifying that the detected delta changes between the different clients and the gaming network indicate cheating based on the one or more identified pre-defined thresholds, wherein the evaluation and the pre-defined thresholds are based on parameters associated with the performance of the gaming network identified as acceptable user activity.

2. The method of claim 1, further comprising identifying at least one user associated with the client sending the monitored data packets that include indicia exceeding the predefined threshold.

3. The method of claim 2, further comprising sending information over the gaming network indicating that the client sending the monitored data packets is suspected of cheating, the information sent by way of a network interface communicatively coupled to the gaming network.

4. The method of claim 1, further comprising penalizing the at least one user associated with the client sending the monitored data packets that include indicia exceeding the predefined threshold.

5. The method of claim 1, wherein the sequence number is encrypted.

6. The method of claim 1, wherein the change in deltas of the sequence number of the client is indicative of the existence of packet loss.

7. The method of claim 1, wherein the time stamp is encrypted.

8. The method of claim 1, wherein the change in deltas of the time stamps of the client is indicative of the existence of a change in latency.

9. The method of claim 1, wherein the monitoring is performed at a host server in the gaming network.

10. The method of claim 1, wherein the monitoring is performed at a peer client in the gaming network.

11. A system for detecting cheating in a gaming network, the system comprising:
   a rules library that includes a generated first set of rules defining acceptable user activity in a gaming network, wherein the generated first set of rules are defined based on observations of a performance of the gaming network;
   a network interface that receives data packets from a client in the gaming network, wherein the data packets have tracking data that includes at least one of a sequence number or a time stamp indicating the progression of a game character through a game environment in the gaming network, and wherein the received data packets correspond to user activity for the client in the gaming network;
   a monitoring module stored in memory and executable by a processor to monitor the user activity for clients that may violate the generated first set of rules; and
   an analysis engine stored in memory and executable by a processor to determine that a client violated the generated first set of rules thereby identifying the client as a deviant client, wherein the determination that the client violated the generated first set of rules includes:
      identifying one or more pre-defined thresholds corresponding to indicia for changes in deltas between tracking data of data packets associated with the client and tracking data of data packets associated with different clients;

determining that there are changes in deltas between tracking data of data packets associated with the client and tracking data of data packets associated with different clients, detecting that the determined delta changes between the different clients in view of the delta changes with the client exceeds one or more of the pre-defined thresholds used to identify cheating, and identifying that the detected delta changes between the different clients and the gaming network indicate cheating based on the one or more identified pre-defined thresholds, wherein the evaluation and the pre-defined thresholds are based on parameters associated with the performance of the gaming network identified as acceptable user activity.

12. The system of claim 11, wherein execution of the analysis engine by the processor further identifies at least one user suspected of cheating.

13. The system of claim 12, wherein the network interface also sends information over the gaming network indicating that the at least one user is suspected of cheating.

14. The system of claim 11, further comprising penalizing the at least one user associated with the client sending the monitored data packets that include indicia exceeding the predefined threshold.

15. The system of claim 11, wherein the sequence number is encrypted.

16. The system of claim 11, wherein the change in deltas of the sequence number of the client is indicative of packet loss.

17. The system of claim 11, wherein the time stamp is encrypted.

18. The system of claim 11, wherein the change in deltas of the time stamps of the client is indicative of the existence of a change in latency.

19. The system of claim 11, wherein the monitoring module is located at a host server in the gaming network.

20. The system of claim 11, wherein the monitoring module is located at a peer client in the gaming network.

21. A non-transitory computer-readable storage medium having embodied thereon a program, the program being executable by a processor to perform a method for detecting cheating in a gaming network, the method comprising:

generating a first set of rules, wherein the first set of rules define acceptable user activity in a gaming network, and wherein the generated rules are defined based on observations of a performance of the gaming network;

receiving data packets from a client in the gaming network, wherein the data packets have having tracking data that includes at least one of a sequence number or a time stamp indicating the progression of a game character through a game environment in the gaming network, and wherein the received data packets correspond to user activity for the client in the gaming network;

monitoring the user activity for clients that may violate the generated first set of rules, wherein the user activity is monitored in response to execution of a monitoring module by a processor, and wherein the monitoring module is stored in memory; and determining that a client violated the generated first set of rules thereby identifying the client as a deviant client, wherein the determination that the client violated the generated first set of rules includes:

identifying one or more pre-defined thresholds corresponding to indicia for changes in deltas between tracking data of data packets associated with the client and tracking data of data packets associated with different clients;

determining that there are changes in deltas between tracking data of data packets associated with the client and tracking data of data packets associated with different clients;

detecting that the determined delta changes between the different clients in view of the delta changes with the client exceeds one or more of the pre-defined thresholds used to identify cheating; and identifying that the detected delta changes between the different clients and the gaming network indicate cheating based on the one or more identified pre-defined thresholds, wherein the evaluation and the pre-defined thresholds are based on parameters associated with the performance of the gaming network identified as acceptable user activity.

\* \* \* \* \*